(12) United States Patent
Atsuchi

(10) Patent No.: US 12,243,452 B2
(45) Date of Patent: Mar. 4, 2025

(54) DISPLAY SYSTEM, CONTROL DEVICE, AND DISPLAY METHOD OF DISPLAY SYSTEM

(71) Applicant: SEIKO EPSON CORPORATION, Tokyo (JP)

(72) Inventor: Robina Atsuchi, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/346,775

(22) Filed: Jul. 3, 2023

(65) Prior Publication Data
US 2024/0013689 A1    Jan. 11, 2024

(30) Foreign Application Priority Data

Jul. 6, 2022   (JP) .................................. 2022-108839

(51) Int. Cl.
*G09G 3/00*    (2006.01)
*G06F 3/01*    (2006.01)

(52) U.S. Cl.
CPC ............. *G09G 3/002* (2013.01); *G06F 3/012* (2013.01); *G09G 2340/0442* (2013.01); *G09G 2340/0464* (2013.01); *G09G 2354/00* (2013.01); *G09G 2356/00* (2013.01); *G09G 2360/04* (2013.01); *G09G 2370/00* (2013.01)

(58) Field of Classification Search
CPC ....... G09G 2340/0442; G09G 2356/00; G09G 2370/00; G09G 2340/045; G09G 3/002; G09G 2340/0464; G09G 2354/00; G09G 2360/04; G06F 3/1423; G06F 3/012; G02B 27/017
See application file for complete search history.

(56) References Cited

U.S. PATENT DOCUMENTS

| | | | |
|---|---|---|---|
| 8,502,780 B1* | 8/2013 | Park ..................... | G06F 3/04886 345/165 |
| 9,035,878 B1* | 5/2015 | Wheeler ............. | G06F 3/03547 345/157 |
| 9,679,538 B2* | 6/2017 | Holmanu ................. | G09G 5/12 |
| 10,001,645 B2* | 6/2018 | Norden ................ | G02B 27/017 |
| 10,175,923 B2* | 1/2019 | Miyasaka .............. | G09G 3/003 |

(Continued)

FOREIGN PATENT DOCUMENTS

JP        2016031373        3/2016

*Primary Examiner* — Benyam Ketema
(74) *Attorney, Agent, or Firm* — JCIPRNET

(57) ABSTRACT

A system includes a projector, an HMD, and a control device. A detection unit detects a first range and a second range when a user visually recognizes a first display image through the HMD, the first range being a range of the first display region overlapping with a second display region in which the HMD displays a second display image, the second range being a range of the first display image corresponding to the first range. A generation unit generates the first display image including an object and the second display image including the object. The control device generates the first display image by arranging, at a position within the second range corresponding to a position of the second display region for displaying the object, the object having a display size corresponding to a distance between the first display region and the HMD.

7 Claims, 11 Drawing Sheets

(56) References Cited

U.S. PATENT DOCUMENTS

| | | | | |
|---|---|---|---|---|
| 2012/0302289 | A1* | 11/2012 | Kang | G06F 3/016 |
| | | | | 455/557 |
| 2014/0009839 | A1* | 1/2014 | Yoshida | G02B 27/108 |
| | | | | 359/632 |
| 2014/0139439 | A1* | 5/2014 | Park | G06F 3/0227 |
| | | | | 345/169 |
| 2015/0317518 | A1* | 11/2015 | Fujimaki | G02B 27/017 |
| | | | | 345/633 |
| 2016/0004335 | A1* | 1/2016 | Hosenpud | G06F 3/04845 |
| | | | | 345/157 |
| 2017/0151034 | A1* | 6/2017 | Oda | A61B 90/37 |
| 2017/0168767 | A1* | 6/2017 | Guo | G06F 3/1462 |
| 2018/0074578 | A1* | 3/2018 | Robbins | G06T 11/60 |
| 2018/0176547 | A1* | 6/2018 | Kobayashi | H04N 13/344 |
| 2018/0276898 | A1* | 9/2018 | Nishizawa | G06T 19/006 |
| 2019/0079590 | A1* | 3/2019 | Tomizawa | G06F 3/012 |
| 2019/0227642 | A1* | 7/2019 | Nishizawa | G06F 3/014 |
| 2021/0124174 | A1* | 4/2021 | Tokunaga | H04N 23/10 |
| 2022/0163802 | A1* | 5/2022 | Mima | G02B 27/0172 |
| 2024/0013689 | A1* | 1/2024 | Atsuchi | G06F 3/011 |

* cited by examiner

DISPLAY SYSTEM, CONTROL DEVICE, AND DISPLAY METHOD OF DISPLAY SYSTEM

The present application is based on, and claims priority from JP Application Serial Number 2022-108839, filed Jul. 6, 2022, the disclosure of which is hereby incorporated by reference herein in its entirety.

BACKGROUND

1. Technical Field

The present disclosure relates to a display system, a control device, and a display method of a display system.

2. Related Art

Hitherto, there has been known a system in which a display device that displays an image on a display surface and a head-mounted display device that is worn on a head of a user and causes the user to visually recognize the image are operated in collaboration.

For example, JP-A-2016-31373 discloses a display system including a first display device that displays an image and a second transmissive-type display device including a display unit that causes a user to visually recognize an image and see an outside scene therethrough. The second display device includes a data acquisition unit and a control unit. The data acquisition unit acquires data relating to a display image to be displayed by the first display device. The control unit causes the display unit to display at least a part of the display image, based on the data acquired by the data acquisition unit when the display image can be visually recognized through the display unit.

When a size of an image to be displayed by the display device is increased, image quality of the image to be displayed may be degraded in some cases. Thus, there has been a demand for improvement of image quality of an image to be visually recognized when the image to be displayed by the display device can be visually recognized through the display unit of the head-mounted display device.

SUMMARY

The present disclosure relates to a display system including: a display device configured to display a first display image on a first display region; a head-mounted display device configured to be mounted on a head of a user and including a display unit configured to display a second display image on a second display region with an outside scene visually recognizable; and a control device including a detection unit configured to detect a first range and a second range when the user visually recognizes the first display image through the display unit, the first range being a range of the first display region with which the second display region overlaps, the second range being a range of the first display image corresponding to the first range, and a generation unit configured to generate the first display image including an object and the second display image including the object, wherein the display device displays the first display image including the object, the head-mounted display device displays the second display image including the object, and the control device generates the first display image by arranging, at a position within the second range corresponding to a position of the second display region for displaying the object, the object having a display size corresponding to a distance between the first display region and the head-mounted display device.

The present disclosure relates to a control device for controlling an image displayed on a display device configured to display a first display image on a first display region and a head-mounted display device configured to be mounted on a head of a user and including a display unit configured to display a second display image on a second display region with an outside scene visually recognizable, the control device including: a detection unit configured to detect a first range and a second range when the user visually recognizes the first display image through the display unit, the first range being a range of the first display region with which the second display region overlaps, the second range being a range of the first display image corresponding to the first range; a generation unit configured to generate the first display image including an object and the second display image including the object; and a transmission unit configured to transmit the first display image including the object to the display device and transmit the second display image including the object to the head-mounted display device, wherein the generation unit generates the first display image by arranging, at a position within the second range corresponding to a position of the second display region for displaying the object, the object having a display size corresponding to a distance between the first display region and the head-mounted display device.

The present disclosure relates to a display method of a display system, the display system including a display device configured to display a first display image on a first display region and a head-mounted display device configured to be mounted on a head of a user and including a display unit configured to display a second display image on a second display region with an outside scene visually recognizable, the display method including: detecting a first range and a second range when the user visually recognizes the first display image through the display unit, the first range being a range of the first display region with which the second display region overlaps, the second range being a range of the first display image corresponding to the first range; generating the first display image including an object and the second display image including the object; and transmitting the first display image including the object to the display device and transmitting the second display image including the object to the head-mounted display device, wherein in the generation of the first display image, the first display image is generated by arranging, at a position within the second range corresponding to a position of the second display region for displaying the object, the object having a display size corresponding to a distance between the first display region and the head-mounted display device.

DESCRIPTION OF EXEMPLARY EMBODIMENTS

1. System Configuration of Display System

With reference to the drawings, exemplary embodiments of the present disclosure are described below.

Figure 1:
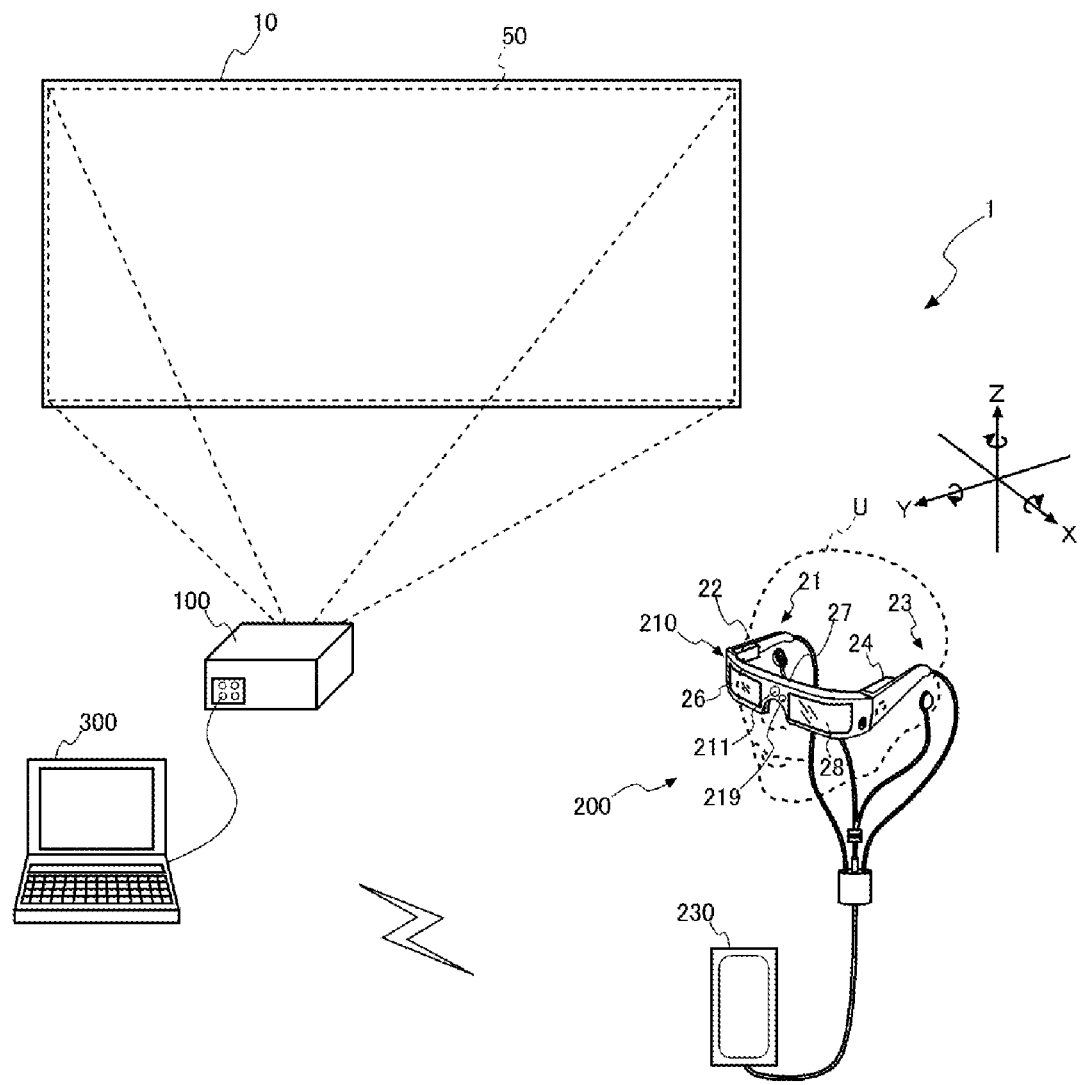
FIG. 1 is a diagram illustrating a system configuration of a display system.

FIG. 1 is a diagram illustrating an overall configuration of a display system 1.

The display system 1 includes a projector 100, a head-mounted display device 200, and a control device 300. In the following description, the head-mounted display device 200 is described as a Head Mounted Display (HMD) 200.

The control device 300 is connected to the projector 100 and the head-mounted display device 200 so as to establish data communication. FIG. 1 illustrates an example in which the control device 300 and the projector 100 are wire-connected to each other and the control device 300 and the HMD 200 are wirelessly connected to each other. However, the control device 300 and the projector 100 may be wirelessly connected to each other.

FIG. 1 illustrates one projector 100, one HMD 200, and one control device 300. However, the number of projectors 100, the number of HMDs 200, and the number of control devices 300 may be freely selected.

For example, there may be adopted a configuration in which the display system 1 includes a plurality of HMDs 200 and the plurality of HMDs 200 are worn on heads of a plurality of users U, respectively.

The projector 100 generates image light, based on image data supplied from the control device 300, and project the generated image light onto a projection surface 10. With this, an image corresponding to the image data is displayed on the projection surface 10. An image displayed by the projector 100 on the projection surface 10 is referred to as a first display image. Further, a region of the projection surface 10 in which the projector 100 displays the first display image is referred to as a first display region 50. The projection surface 10 may be a hanging screen, or an outer wall of a building, a wall surface of a room, a flat surface of an installed object, or the like may be used as the projection surface 10. Further, the projection surface 10 is not limited to a flat surface, and may be a curved surface or a surface having irregularities.

The HMD 200 includes an HMD display device 210 that is worn on the head of the user U and an HMD control device 230 that controls the HMD display device 210. The HMD 200 is a display device of an optical transmissive type that causes the user U wearing the HMD display device 210 on the head to visually recognize an image and also causes the user U to directly visually recognize an outside scene. The HMD display device 210 corresponds to a display unit. The HMD 200 causes the HMD display device 210 to display an image based on the image data received from the control device 300. An image that the HMD display device 210 causes the user to visually recognize is referred to as a second display image.

The HMD control device 230 may be a device provided specifically for the HMD 200, or there may be adopted a configuration in which an external device such as a smartphone is connected via a connection device to which the HMD display device 210 is connected. In a case of the configuration in which the external device is connected via the connection device, the connection device executes processing for operating various sensors included in the HMD display device 210 or processing for causing the HMD display device 210 to display an image, based on the image data input from the external device.

The control device 300 generates the first display image that is displayed by the projector 100 and the second display image that is displayed by the HMD 200.

The control device 300 receives sensor data from the projector 100 and the HMD 200. The control device 300 generates the first display image and the second display image, based on the received sensor data. The control device 300 transmits the first display image thus generated to the projector 100, and transmits the second display image thus generated to the HMD 200.

2. Configuration of Projector

Figure 2:
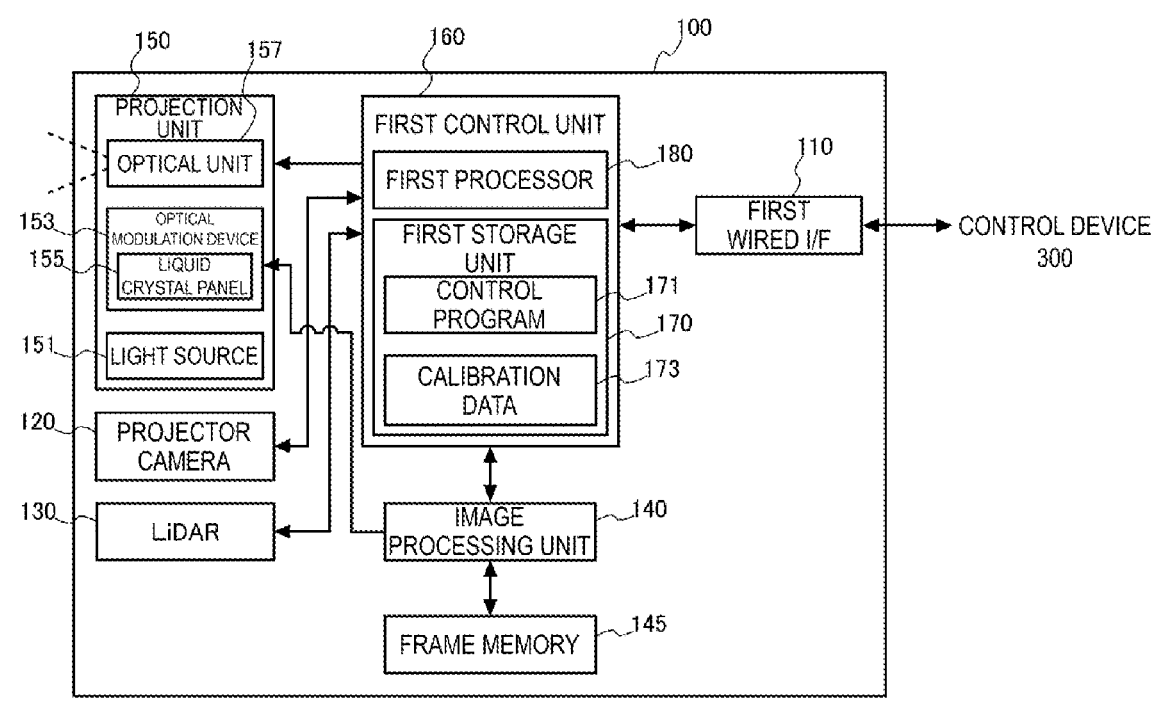
FIG. 2 is a block diagram illustrating a configuration of a projector.

FIG. 2 is a block diagram illustrating a configuration of the projector 100.

With reference to FIG. 2, the configuration of the projector 100 is described.

The projector 100 includes a first wired interface 110, a projector camera 120, a Light Detection And Ranging (LiDAR) 130, an image processing unit 140, a frame memory 145, a projection unit 150, and a first control unit 160. In the following description, an interface is abbreviated to I/F.

The first wired I/F 110 includes a connector in accordance with a predetermined communication standard and an interface circuit, and transmits and receives data with the control device 300 connected thereto via a cable. When the image data is received, the first wired I/F 110 outputs the received image data to the first control unit 160.

The projector camera 120 is a digital camera equipped with an imaging element, such as a charge coupled device (CCD) or a complementary metal oxide semiconductor (CMOS), and imaging lens and the like. The projector camera 120 may be a single-lens camera or a stereo camera.

The projector camera 120 generates a captured image, and outputs the captured image to the first control unit 160.

The LiDAR 130 emits detection light such as laser light, and detects a distance to an object that generates reflection light, based on a time period from emission of the detection light to reception of the reflection light.

The first display image received by the first wired I/F 110 is input from the first control unit 160 to the image processing unit 140. The image processing unit 140 develops the first display image that is input, in the frame memory 145. The image processing unit 140 subjects the first display image, which is developed in the frame memory 145, to resolution conversion processing or re-sizing processing, processing for correcting distortion or correction a shape, digital zoom processing, image processing for adjusting a color or brightness of an image, or the like. As a matter of course, the image processing unit 140 may execute a plurality of kinds of the above-mentioned processing in combination. After the image processing is completed, the image processing unit 140 generates a display signal corresponding to the first display image developed in the frame memory 145, and outputs the generated display signal to the projection unit 150.

Each of the image processing unit 140 and the frame memory 145 is configured by, for example, an integrated circuit. Examples of the integrated circuit include a Large Scale Integrated Circuit (LSI), an Application Specific Integrated Circuit (ASIC), a Programmable Logic Device (PLD), a Field-Programmable Gate Array (FPGA), and a System-on-a-chip (SoC). Further, a part of the configuration of the integrated circuit may include an analog circuit, and there may be adopted a configuration in which the first control unit 160 and the integrated circuit are combined with each other.

The projection unit 150 includes a light source 151, an optical modulation device 153, and an optical unit 157.

The light source 151 includes a discharge-type light source lamp such as an ultra-high pressure mercury lamp and a metal halide lamp, or a solid light source such as a light-emitting diode and a semiconductor laser. The light emitted from the light source 151 enters the optical modulation device 153.

The optical modulation device 153 includes a transmissive-type liquid crystal panel 155 obtained by encapsulating liquid crystal between a pair of transparent base boards, as an optical modulation element that modulates the light emitted from the light source 151. The liquid crystal panel 155 includes a plurality of pixels arranged in a matrix. The optical modulation device 153 applies, to each of the pixels of the liquid crystal panel 155, a driving voltage corresponding to a display signal input from the image processing unit 140, and changes a light transmittance of each of the pixels to a transmittance corresponding to the image data. The light emitted from the light source 151 passes through the liquid crystal panel 155, and thus the light emitted from the light source 151 is modulated. With this, the image light corresponding to the first display image is generated.

The optical modulation element included in the optical modulation device 153 is not limited to the transmissive-type the liquid crystal panel 155, and may be, for example, a reflection-type liquid crystal panel or a Digital Micromirror Device (DMD).

The optical unit 157 includes a projection lens or the like, which is omitted in illustration, and projects the image light modulated by the optical modulation device 153 onto the projection surface 10 in an enlarged manner. With this, the first display image being an image corresponding to the image light is displayed on the first display region 50 of the projection surface 10.

The first control unit 160 is a computer device including a first storage unit 170 and a first processor 180.

The first storage unit 170 includes a semiconductor memory such as a Read Only Memory (ROM) and a Random Access Memory (RAM).

The first storage unit 170 stores a program to be executed by the first processor 180 or various data to be processed by the first processor 180, in a non-volatile manner. For example, the first storage unit 170 stores a control program 171 such as firmware executed by the first processor 180 and calibration data 173. Further, the first storage unit 170 stores data processed during execution of the control program 171, data relating to the processing results, and the like.

The calibration data 173 is data in which the first display image that is displayed on the projection surface 10 and the first display image being a captured image of the projection surface 10 that is captured by the projector camera 120 are associated with each other.

The calibration data 173 is generated by the following method.

First, the projector 100 generates the image light by developing a pattern image prepared in advance on the liquid crystal panel 155, and then projects the generated image light onto the projection surface 10. The pattern image is an image having an image pattern that is set in advance. For example, the pattern image is an image in which dots are formed at a constant interval on the entire pattern image.

Subsequently, the projector 100 causes the projector camera 120 to capture an image of the projection surface 10, and thus generates the captured image. The projector 100 analyzes the captured image thus generated, and specifies a position of each of the dots included in the pattern image. Then, the projector 100 associates the position of each of the dots in the captured image and the position of each of the dots in the pattern image developed on the liquid crystal panel 155 with each other, and thus generates the calibration data 173.

The first processor 180 is configured by one or more Central Processing Units (CPUs), a microcomputer, a Digital Signal Processor (DSP), or the like. The first processor 180 executes a program, and thus controls each of the units of the projector 100. The first processor 180 may be configured by an SoC in which the first processor 180 and the first storage unit 170 are integrated with each other.

The first control unit 160 causes the projector camera 120 to capture an image, causes the LiDAR 130 to perform measurement, or the like, according to an instruction from the control device 300. The first control unit 160 transmits the captured image from the projector camera 120 or sensor data indicating the measurements result from the LiDAR 130, to the control device 300.

3. Configuration of HMD

Figure 3:
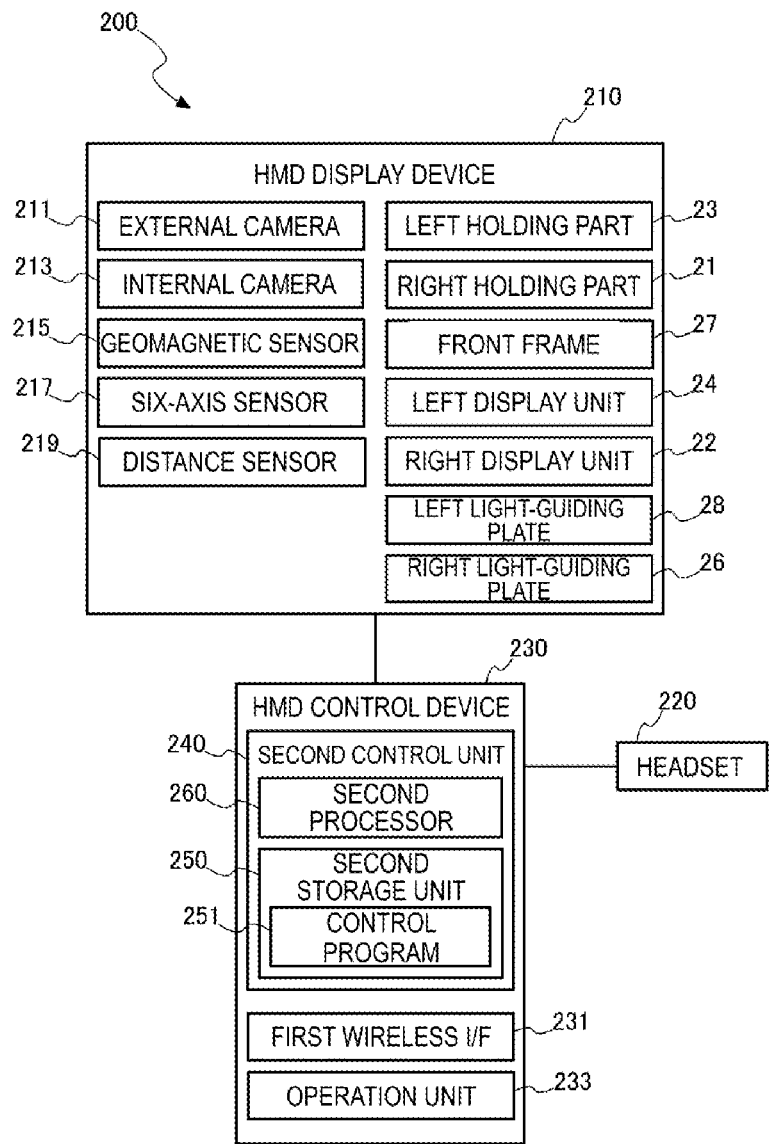
FIG. 3 is a block diagram illustrating a configuration of a head-mounted display device.

Next, with reference to FIG. 3, the configuration of the HMD 200 is described.

As illustrated in FIG. 1, the HMD display device 210 is an eyeglass-like member. The HMD display device 210 includes a main body including a right holding part 21, a left holding part 23, and a front frame 27. The main body further includes a right display unit 22, a left display unit 24, a right light-guiding plate 26, and a left light-guiding plate 28. Further, an external camera 211, an internal camera 213, a geomagnetic sensor 215, a six-axis sensor 217, and a distance sensor 219 are mounted as sensors on the HMD display device 210.

The right holding part 21 and the left holding part 23 extend rearward from the corresponding two ends of the front frame 27 to hold the HMD display device 210 on the head of the user U.

The front frame 27 has a shape formed by coupling an end of the right light-guiding plate 26 and an end of the left light-guiding plate 28 to each other, and this coupling position corresponds to a position between the eyebrows of the user U in a state in which the user U wears the HMD display device 210.

Each of the right display unit 22 and the left display unit 24 is a module obtained by unitizing an optical unit and a peripheral circuit. The right display unit 22 displays an image with the right light-guiding plate 26, and the left display unit 24 displays an image with the left light-guiding plate 28. The right display unit 22 is attached to the right holding part 21, and the left display unit 24 is attached to the left holding part 23.

The right display unit 22 includes, as a configuration that causes a right eye to visually recognize an image, a right Organic Light Emitting Diode (OLED) unit that emits image light and a right optical system that guides the image light emitted from the right OLED unit to the right light-guiding plate 26. Further, the left display unit 24 includes, as a configuration that causes a left eye to visually recognize an image, a left OLED unit that emits image light and a left optical system that guides the image light emitted from the left OLED unit to the left light-guiding plate 28. The right OLED unit, the left OLED unit, the right optical system, and the left optical system are omitted in illustration. The user U visually recognizes the second display image being the image light guided by the right light-guiding plate 26 and the left light-guiding plate 28. Further, within a visual field range of the user U wearing the HMD display device 210 on the head, a region in which the HMD display device 210 is capable of displaying the second display image is referred to as a second display region 70.

The external camera 211 is provided at a position on the front frame 27 so that the external camera 211 does not block the outside light passing through the right light-guiding plate 26 and the left light-guiding plate 28. The external camera 211 is a digital camera including an image capturing element such as a CCD and a CMOS, an image capturing lens, and the like, and may be a monocular camera or a stereo camera. An angle of view of the external camera 211 includes at least a part of a range of an outside scene visually recognized by the user U wearing the HMD display device 210, through the right light-guiding plate 26 and the left light-guiding plate 28.

The internal camera 213 is arranged in the HMD display device 210 so as to face the face of the user U, and captures images of the right eye and the left eye of the user U. The HMD 200 analyzes the captured images from the internal camera 213, and specifies a direction of a line-of-sight of the right eye and a direction of a line-of-sight of the left eye.

The geomagnetic sensor 215 is a three-axis sensor that detects a magnetic field in an X axis direction, a Y axis direction, and a Z axis direction. The X axis, the Y axis, and the Z axis are respective three axis directions orthogonal to one another as illustrated in FIG. 1, the Z axis direction corresponds to a vertical direction, the X axis direction corresponds to a left-right direction of the head of the user U, and the Y axis direction corresponds to a front-back direction of the head of the user U.

The six-axis sensor 217 is a motion sensor including a three-axis acceleration sensor and a three-axis gyro sensor. The six-axis sensor 217 may adopt an IMU in which the sensors described above are provided as a module.

The geomagnetic sensor 215 and the six-axis sensor 217 execute sampling for a predetermined cycle of, for example, 50 msec, and output an analog voltage value indicating a detection result. The output voltage value is converted into a digital signal by an A/D converter, and is output to the second control unit 240.

The distance sensor 219 detects a distance to a target object positioned in front of the user U. The target object is a real object or a structure in a real space. The distance sensor 219 may be, for example, a light reflecting distance sensor. Specifically, examples of the distance sensor include a sensor having a light source such as an LED and a laser diode and a light receiving unit that receives reflection light obtained by light emitted from the light source being reflected at a target object. Further, the distance sensor 219 may also be an ultrasonic distance sensor. In other words, the distance sensor 219 may include a sound source that emits ultrasonic waves and a detection unit that receives ultrasonic waves reflected at a target object. In addition, the distance sensor 219 may be a laser range scanner that is also called a range sensor.

Next, the HMD control device 230 is described.

The HMD control device 230 includes a first wireless I/F 231, an operation unit 233, and a second control unit 240. Further, a headset 220 is connected to the HMD control device 230 via an audio connector, which is omitted in illustration.

The headset 220 includes a right earphone and a left earphone constituting a stereo headphone, and a microphone. The right earphone and the left earphone output a sound based on a sound signal that is input from the second control unit 240. Further, the microphone generates a sound signal by collecting sounds, and outputs the generated sound signal to the second control unit 240.

The first wireless I/F 231 is, for example, a wireless communication device including a communication circuit in accordance with a standard such as Bluetooth and Wi-Fi. Bluetooth and Wi-Fi are registered trademarks. The first wireless I/F 231 is wirelessly connected to the control device 300, and executes mutual data communication with the control device 300.

The operation unit 233 is a reception unit that includes a button, a switch, or the like and receives an operation of the user U. The operation unit 233 outputs an operation signal corresponding to the received operation, to the HMD control device 230.

The second control unit 240 includes a second storage unit 250 and a second processor 260.

The second storage unit 250 includes a ROM and a RAM. Further, the second storage unit 250 may be configured to include a non-volatile memory such as a flash memory in addition to the ROM and the RAM. The second storage unit 250 stores a program to be executed by the second processor 260 or various data to be processed by the second processor 260, in a non-volatile manner. The second storage unit 250 stores an operating system being a basic control program executed by the second processor 260 and an application program operated on the operating system, for example. Further, the second processor 260 stores data processed during execution of the application program and data relating to processing results.

The second processor 260 is configured by one or more CPUs, a microcomputer, or a DSP, and controls each of the units of the HMD control device 230 by executing a program. The second processor 260 may be an SoC in which the second processor 260 and the second storage unit 250 are integrated with each other.

According to an instruction from the control device 300, the second control unit 240 causes the external camera 211 and the internal camera 213 to capture images, and causes the geomagnetic sensor 215, the six-axis sensor 217, and the distance sensor 219 to execute measurement. The second control unit 240 transmits, to the control device 300, the captured images from the external camera 211 and the internal camera 213 and the sensor data indicating the measurement results from the geomagnetic sensor 215, the six-axis sensor 217, and the distance sensor 219.

4. Configuration of Control Device

Figure 4:
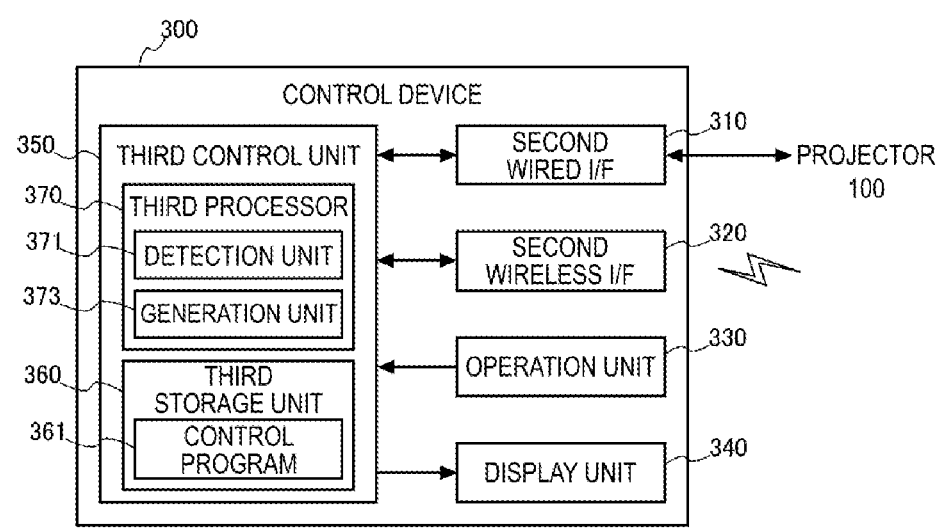
FIG. 4 is a block diagram illustrating a configuration of a control device.

Next, with reference to FIG. 4, the configuration of the control device 300 is described. FIG. 4 is a block configuration diagram illustrating the configuration of the control device 300.

The control device 300 is a so-called computer device, and a computer of a notebook type, a desktop type, a tablet type, or the like is used.

The control device 300 includes a second wired I/F 310, a second wireless I/F 320, an operation unit 330, a display unit 340, and a third control unit 350.

The second wired I/F 310 corresponds to a transmission unit, includes a connector in accordance with a predetermined communication standard and an interface circuit, and transmits and receives data with the projector 100 connected thereto via a cable.

The second wireless I/F 320 corresponds to a transmission unit, supports a wireless communication protocol such as Bluetooth and Wi-Fi, is wirelessly connected to the HMD 200, and executes mutual data communication with the HMD 200.

The operation unit 330 includes an input device such as a mouse and a keyboard, and receives an operation from the user. The operation unit 330 outputs, to the third control unit 350, an operation signal corresponding to the operation received from the input device.

The display unit 340 includes, for example, a display panel such as a liquid crystal panel and an organic Electro-Luminescence (EL) panel, and displays, on the display panel, a display image that is generated by the third control unit 350. The display panel is omitted in illustration.

The third control unit 350 is a computer device including a third storage unit 360 and a third processor 370.

The third storage unit 360 includes a non-volatile memory such as a ROM and a volatile memory such as a RAM. Further, the third storage unit 360 may be configured to include an auxiliary storage device such as a Hard Disk Drive (HDD) and a Solid State Drive (SSD).

The third storage unit 360 stores a control program 361 to be executed by the third processor 370 or various data to be processed by the third processor 370, in a non-volatile manner. The third storage unit 360 stores, as the control program 361, an operating system being a basic control program executed by the third processor 370 and an application program operated on the operating system, for example. The application program includes an application program for controlling display of the projector 100 and the HMD 200. In the following description, the application program is described as APP. Further, the third storage unit 360 stores data processed during execution of the control program 361 and data relating to the processing results.

The third processor 370 is configured by one or more CPUs, a microcomputer, or a DSP, and controls each of the units of the control device 300 by executing a program. The third processor 370 may be an SoC in which the third processor 370 and the third storage unit 360 are integrated with each other. The third processor 370 includes a detection unit 371 and a generation unit 373 as functional configurations. Those functional configurations are functions implemented by arithmetic operations executed by the third processor 370 following the control program 361.

The third control unit 350 generates the first display image and the second display image.

The first display image is an image projected by the projector 100. The second display image is an image displayed by the HMD 200. In the present exemplary embodiment, description is made assuming that the second display image displayed by the HMD 200 is an image that is displayed when the user U visually recognizes the first display region 50 of the projection surface 10 through the HMD display device 210.

First, the detection unit 371 determines whether at least a part of the second display region 70 of the HMD 200 overlaps with at least a part of the projection surface 10. For example, when the first display image displayed by the projector 100 is detected from a predetermined range of the captured image from the external camera 211, the detection unit 371 determines that at least a part of the second display region 70 of the HMD 200 overlaps with at least a part of the projection surface 10.

The predetermined range of the captured image that is obtained from the external camera 211 corresponds to a range in which the HMD display device 210 displays the second display image. The external camera 211 is fixed to the HMD display device 210, and the angle of view of the external camera 211 is set to a constant angle. Thus, in the captured image from the external camera 211, the range in which the HMD display device 210 displays the second display image is a constant range.

When the detection unit 371 determines that at least a part of the second display region 70 of the HMD 200 overlaps with at least a part of the projection surface 10, the third control unit 350 causes the second display image displayed by the HMD display device 210 to overlap with the first display image displayed by the projector 100 on the projection surface 10. In other words, the user U visually recognizes one image in which the second display image displayed by the HMD display device 210 and a part of the first display image displayed on the projection surface 10 overlap with each other. A size of the second display image displayed by the HMD display device 210 is smaller than a size of the first display image displayed by the projector 100 on the projection surface 10. Thus, the second display image displayed by the HMD display device 210 overlaps with a part of the first display image displayed on the projection surface 10.

The detection unit 371 determines a range in which the second display region 70 of the HMD display device 210 overlaps with the projection surface 10. The detection unit 371 detects a distance between the HMD 200 and the projection surface 10 and an angle of the projection surface 10 with respect to the HMD 200, based on the sensor data received from the HMD 200. Further, in addition to those, the detection unit 371 may detect orientation of the head of the user U. The detection unit 371 determines the range in which the second display region 70 overlaps with the projection surface 10, based on the distance between the HMD 200 and the projection surface 10 and the angle of the projection surface 10 with respect to the HMD 200 that are detected. Further, the detection unit 371 may determine the range in which the second display region 70 overlaps with the projection surface 10, based on the orientation of the head of the user U, in addition to the distance between the HMD 200 and the projection surface 10 and the angle of the projection surface 10 with respect to the HMD 200 that are detected. In the following description, a range of the projection surface 10 with which the second display region 70 overlaps is referred to as a first range.

First, the detection unit 371 obtains the distance from the HMD 200 to the projection surface 10.

As the position of the HMD 200, a position of the distance sensor 219 mounted on the HMD 200 is used, for example. The detection unit 371 obtains the distance from the HMD 200 to the projection surface 10, based on the sensor data measured by the distance sensor 219.

Figure 5:
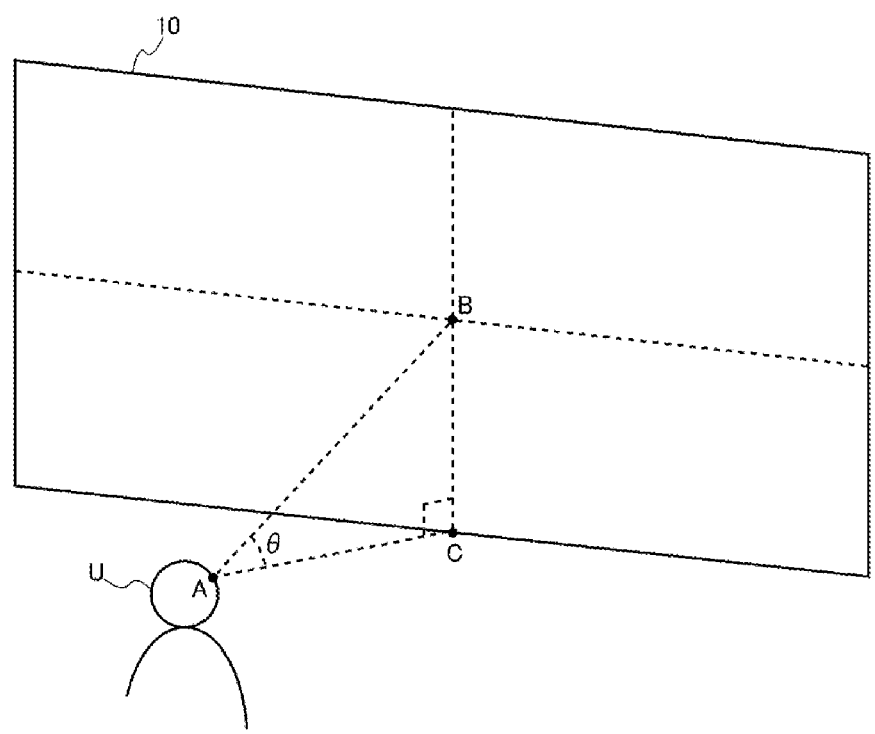
FIG. 5 is a diagram illustrating an angle of a projection surface with respect to the head-mounted display device.

FIG. 5 is a diagram illustrating an angle θ of the projection surface 10 with respect to the HMD 200.

Subsequently, the detection unit 371 obtains the angle of the projection surface 10 with respect to the HMD 200.

The third control unit 350 obtains the angle θ of the projection surface 10 with respect to the HMD 200, based on the sensor data measured by the distance sensor 219. It is assumed that the position of the distance sensor 219 included in the HMD display device 210 is a position A and the center of the projection surface 10 in the vertical direction and the horizontal direction is a position B. Further, it is assumed that a position at which a line segment horizontal to the normal line of the projection surface 10 from the position A as a starting point intersects with the projection surface 10 is a position C. In this case, the angle θ of the projection surface with respect to the HMD 200, in other words, the angle θ of the projection surface 10 with respect to the distance sensor 219 is an angle at the time of viewing the position C and the position B from the position A.

Further, the detection unit 371 detects an azimuthal angle being a direction in which the head of the user U is oriented, based on the measurement results from the six-axis sensor 217 and the geomagnetic sensor 215. Further, the detection unit 371 detects a yaw angle being a turning angle of the head of the user U about the Z axis and an angular speed indicating a turning speed of the head, based on the measurement result from the gyro sensor included in the six-axis sensor 217.

The detection unit 371 determines the first range being the range of the projection surface 10 with which the second display region 70 overlaps, based on the distance between the HMD 200 and the projection surface 10 and the angle of the projection surface 10 with respect to the HMD 200. Further, the first range may be detected, based on the orientation of the head in addition.

The second display region 70 determines the first range being the range of the projection surface 10, and then the detection unit 371 subsequently detects a second range. The second range is a range of the first display image that corresponds to the first range. In other words, the second range is a range of the first display image that is displayed in the first range.

Based on the calibration data 173, the detection unit 371 detects the second range being the range of the first display image that is displayed in the first range.

The generation unit 373 generates the first display image and the second display image. For example, the first display image may be an image obtained by reproducing an image stored in the third storage unit 360 or an image received from the second wireless I/F 320. Further, the first display image may be a still image or a moving image.

Further, the generation unit 373 extracts, from the first display image, the image corresponding to the second range detected by the detection unit 371, and thus generates the second display image.

The third control unit 350 transmits the first display image to the projector 100, and transmits the second display image to the HMD 200.

Figure 6:
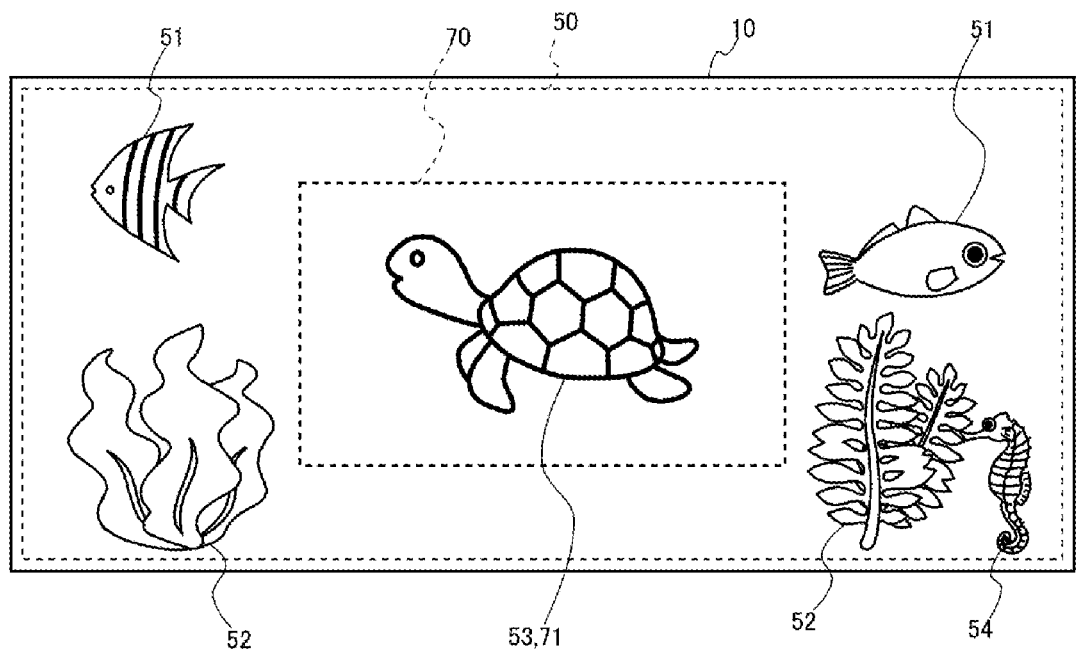
FIG. 6 is a diagram illustrating an example of an image visually recognized by a user in a state in which a display region of the head-mounted display device overlaps with the projection surface.
Figure 7:
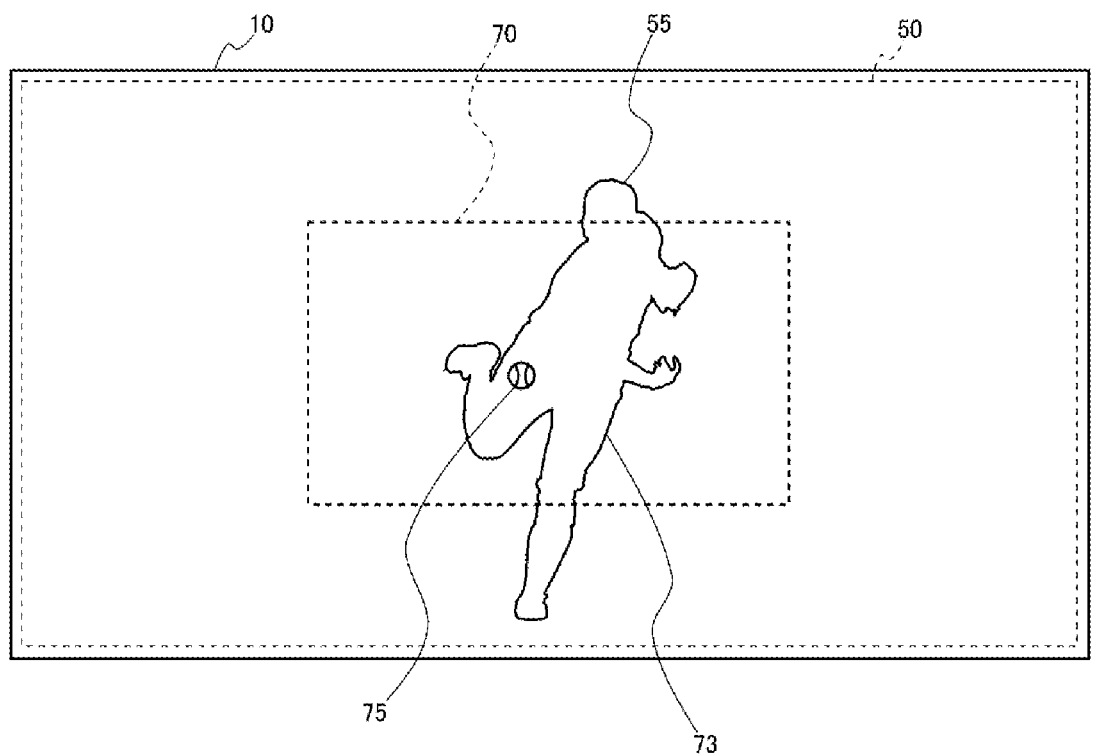
FIG. 7 is a diagram illustrating an example of an image visually recognized by a user in a state in which the display region of the head-mounted display device overlaps with the projection surface.

FIG. 6 and FIG. 7 are diagrams illustrating examples of images visually recognized by the user U in a state in which the second display region 70 of the HMD 200 overlaps with the first display region 50 of the projection surface 10.

In the example of the image illustrated in FIG. 6, a fish image 51, a seaweed image 52, a turtle image 53, and a sea horse image 54 are displayed as the first display image in the first display region 50 by the projector 100. Further, a turtle image 71 is displayed as the second display image in the second display region 70 by the HMD 200.

The user U visually recognize one image in which the turtle image 53 displayed by the projector 100 on the projection surface 10 and the turtle image 71 displayed by the HMD 200 in the second display region 70 overlap with each other.

In the example of the image illustrated in FIG. 7, a pitcher image 55 is displayed as the first display image in the first display region 50 by the projector 100. Further, a part 73 of a pitcher image and a ball image 75 are displayed as the second display image in the second display region 70 by the HMD 200. The part 73 of the pitcher image is an image in the second display region 70 indicated with the broken line in FIG. 7.

The user U visually recognize one image in which the pitcher image 55 displayed by the projector 100 on the projection surface 10 and the part 73 of the pitcher image displayed by the HMD 200 in the second display region 70 overlap with each other.

Further, the projector 100 may display the pitcher image 55, and the HMD 200 may only display the ball image 75 in the second display region 70 without displaying the part 73 of the pitcher image.

The ball image 75 displayed in the second display region 70 by the HMD 200 is a three-dimensional image, and is stereoscopically visually recognized by the user U.

The third control unit 350 calculates a position of an image to be visually recognized by the user U, executes an arithmetic operation for parallax of both the eye views so that a visual image is recognized at the position, and transmits the right and left images with parallax to the HMD 200. The right display unit 22 of the HMD 200 outputs the image visually recognized by the user U with the right eye via the right light-guiding plate 26. Similarly, the left display unit 24 outputs the image visually recognized by the user U with the left eye via the left light-guiding plate 28. With this, the HMD 200 displays the ball image 75 so that the ball thrown from the pitcher flies toward the user U, which is omitted in illustration, as the batter. The user U wears a haptics device on the arm in advance. With this, when the user U swings a bat, the user U can obtain a sense of hitting a ball.

Figure 8:
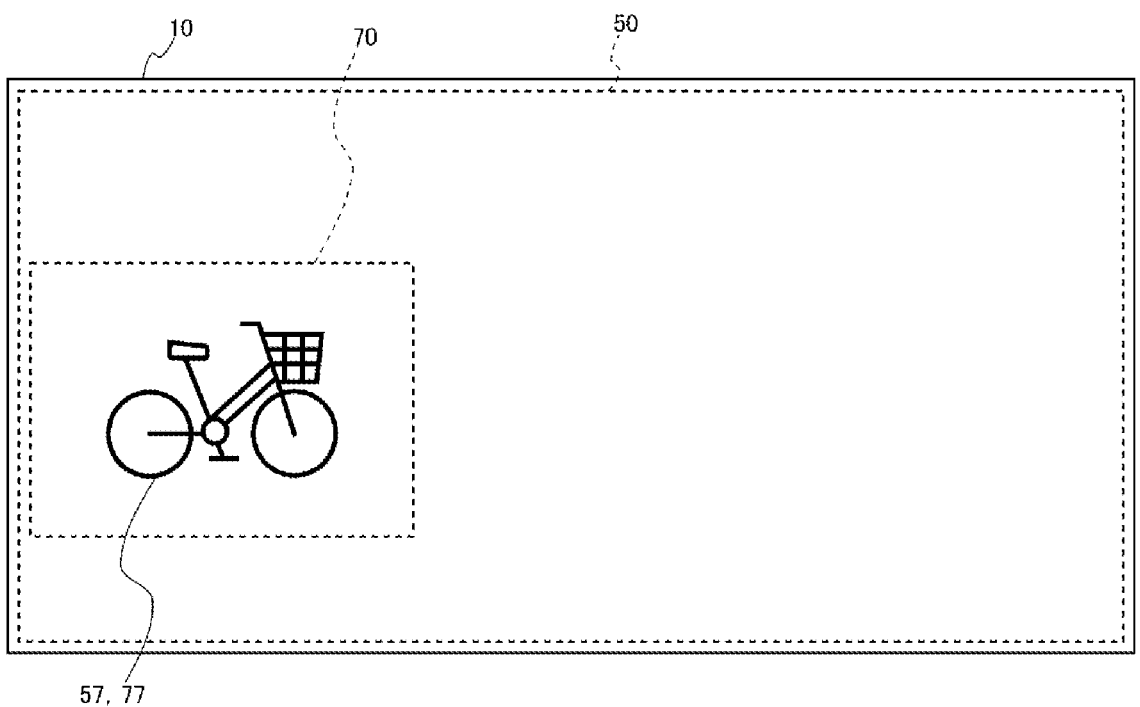
FIG. 8 is a diagram illustrating an example of an image visually recognized by a user in a state in which the display region of the head-mounted display device overlaps with the projection surface.
Figure 9:
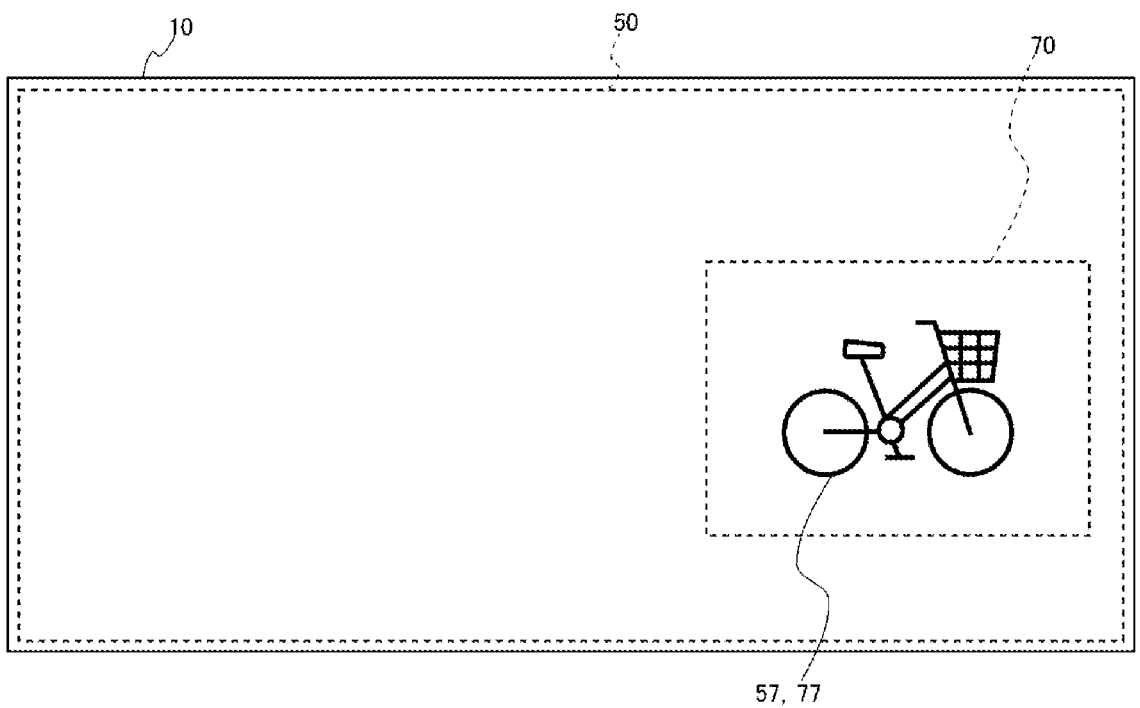
FIG. 9 is a diagram illustrating an example of an image visually recognized by a user in a state in which the display region of the head-mounted display device overlaps with the projection surface.

FIG. 8 and FIG. 9 are diagrams illustrating examples of images visually recognized by the user U in a state in which the second display region 70 of the HMD 200 overlap with the first display region 50.

FIG. 8 and FIG. 9 illustrate the examples of the images in which the same object is displayed by the projector 100 and the HMD 200. The image illustrated in FIG. 8 is a diagram illustrating an image visually recognized by the user U before the head of the user U turns. The image illustrated in FIG. 9 is a diagram illustrating an image visually recognized by the user U after the head of the user U turns in the right direction.

FIG. 8 and FIG. 9 illustrate a bicycle image 57 displayed as an object by the projector 100 and a bicycle image 77 displayed as an object by the HMD 200. The user U visually recognize one image in which the bicycle image 57 and the bicycle image 77 overlap with each other.

The object is an image included in the first display image and the second display image when the user U visually recognizes the first display region 50 of the projection surface 10 through the HMD display device 210. Further, in the second display image, the object is displayed at the constant position in the second display region 70 regardless of movement of the head of the user U. Further, in the first display region, the object is an image that moves in the first display region 50 in accordance with movement of the head of the user U.

Even when the head of the user U turn in the left direction or the right direction, the bicycle image 77 displayed by the HMD 200 is displayed at the same position in the second display region 70. The bicycle image 57 displayed by the projector 100 moves in the first display region 50 in accordance with movement of the head of the user U. In other words, in the first display image displayed by the projector 100, the bicycle image 57 is displayed at the position in the first display region 50 so as to overlap with the bicycle image 77 displayed in the second display region 70 by at which the HMD 200.

Here, description is made on a moving speed of the object displayed in the first display region.

A moving speed of the bicycle image 57 displayed in the first display region 50 is changed by the distance between the HMD 200 and the projection surface 10 and an angular speed being the turning speed of the head of the user U.

It is assumed that the projection surface 10 is arranged at a position away from the HMD 200 by a first distance R1 and a position away from the HMD 200 by a second distance R2. The first distance R1 is smaller than the second distance R2.

The bicycle image 57 displayed by the projector 100 is displayed so as to overlap with the bicycle image 77 displayed by the second display region 70 as viewed from the user U. Thus, even when the user U turns the head by the same angle, a moving distance of the object on the projection surface 10 arranged at the second distance R2 is larger than a moving distance of the object on the projection surface 10 arranged at the first distance R1. In other words, the moving speed of the object on the projection surface 10 arranged at the second distance R2 is higher than the moving speed of the object on the projection surface 10 arranged at the first distance R1. Thus, the moving speed of the bicycle image 57 displayed in the first display region 50 is changed based on the distance between the HMD 200 and the projection surface 10 and the angular speed being the turning speed of the head of the user U.

Further, the object displayed on the projection surface 10 arranged at the second distance R2 is displayed so that the size thereof is larger than a size of the object displayed on the projection surface 10 arranged at the first distance R1. It is required that the display size of the object displayed on the projection surface 10 match with the display size of the object displayed in the second display region 70 by the HMD 200. Thus, the detection unit 371 increases the display size of the object displayed on the projection surface 10 arranged at the position far away from the HMD 200 by the second distance R2, more than the display size of the object displayed on the projection surface 10 arranged at the position close to the HMD 200 by the first distance R1.

When the detection unit 371 detects that the head of the user U turns in the left direction or the right direction, based on the information relating to the angular speed received from the HMD 200, the detection unit 371 changes the display position of the object in the first display image. The detection unit 371 changes the display position of the object in the first display image, based on the information relating to the angular speed contained in the sensor data received from the HMD 200 and the distance between the HMD 200 and the projection surface 10.

The detection unit 371 obtains the moving direction and the moving amount for moving the object, based on the information relating to the angular speed received from the HMD 200 and the information relating to the distance between the HMD 200 and the projection surface 10.

The generation unit 373 displays the object at the position in the first display image in accordance with the moving direction and the moving amount obtained by the detection unit 371. The third control unit 350 transmits the second display image thus generated to the HMD 200, and transmits the first display image to the projector 100.

Further, the range of the first display region 50 of the projection surface 10 onto which the projector 100 projects the image light may be determined based on the distance between the projector 100 and the projection surface 10 and the angle of the projection surface 10 with respect to the projector 100.

The distance between the projector 100 and the projection surface 10 is a distance from the projection lens included in the optical unit 157 of the projector 100 to the projection surface 10. Further, the projection surface 10 is at the position being the center of the projection surface 10 in the vertical direction and the horizontal direction.

The LiDAR 130 included in the projector 100 is capable of measuring a distance from the LiDAR 130 to the projection surface 10 and an angle of the projection surface 10 with respect to the LiDAR 130. Further, in place of the LiDAR 130, the distance between the projector 100 and the projection surface 10 and the angle of the projection surface 10 with respect to the projector 100 may be detected based on the captured image from the projector camera 120.

The information relating to the distance between the LiDAR 130 and the projection lens, the orientation of the projection lens with the position of the LiDAR 130 as a reference, and the like is stored as setting data in the third storage unit 360.

5. Operations of Control Device

Figure 10:
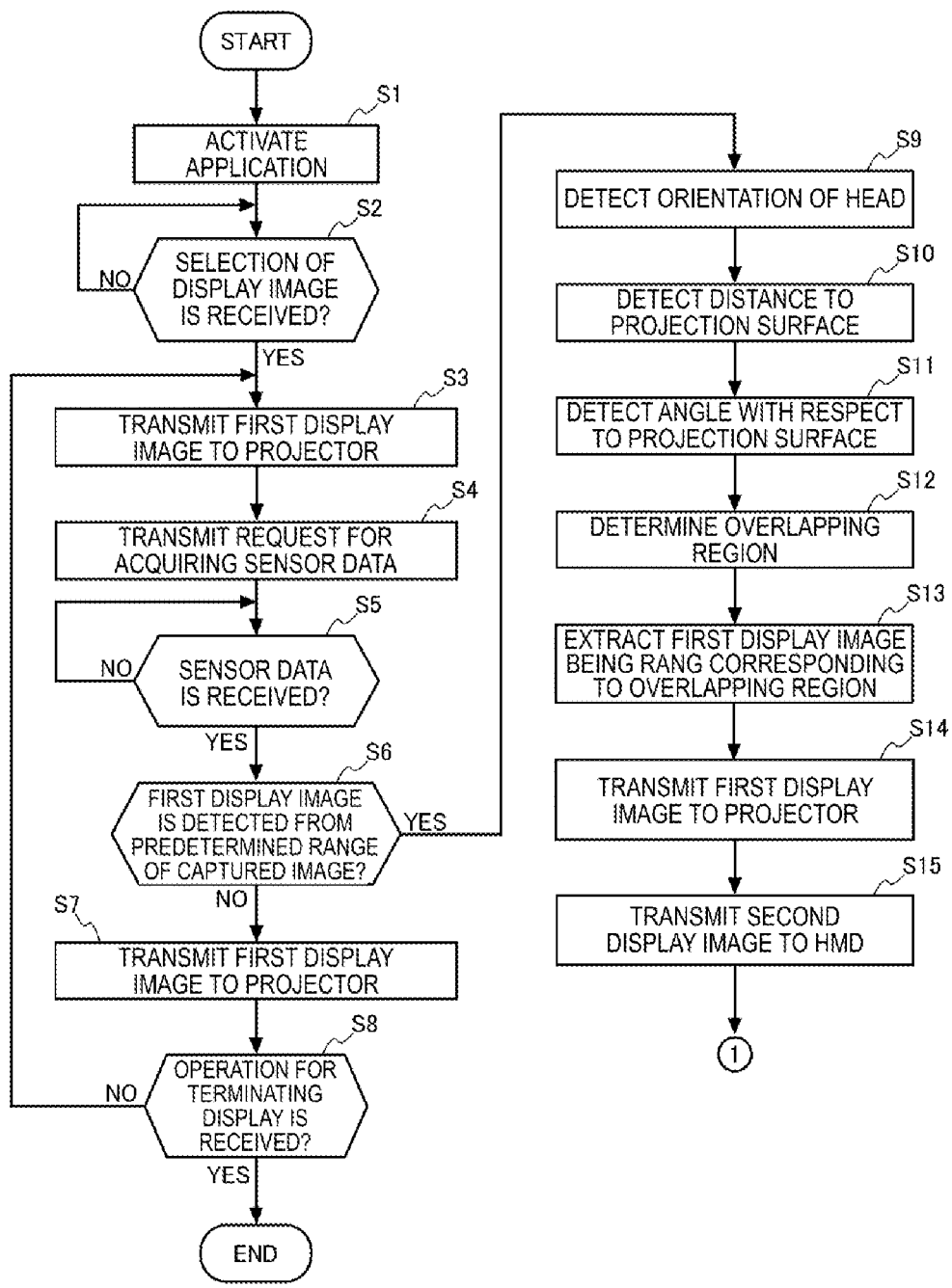
FIG. 10 is a flowchart illustrating an operation of the control device.
Figure 11:
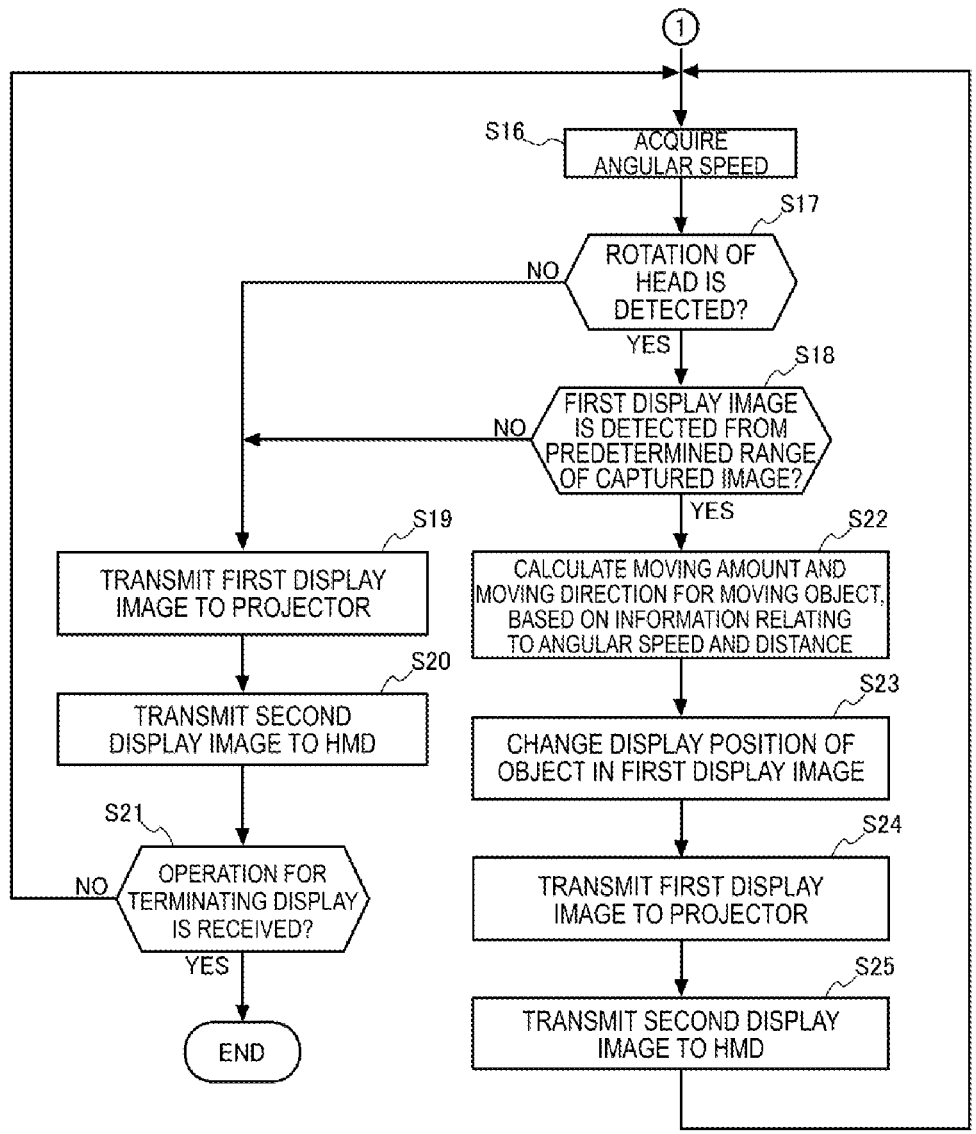
FIG. 11 is a flowchart illustrating an operation of the control device.

FIG. 10 and FIG. 11 are flowcharts illustrating an operation of the control device 300.

With reference to the flowcharts illustrated in FIG. 10 and FIG. 11, the operation of the control device 300 is described.

When an application is selected, the third control unit 350 activates the application (Step S1). Here, description is made on a case in which the application for controlling display of the projector 100 and the HMD 200 is selected.

Subsequently, the third control unit 350 determines whether an operation of selecting the first display image is received (Step S2). When the operation of selecting the first display image is not received (NO in Step S2), the third control unit 350 stands by until the operation of selecting the first display image is received.

When the operation of selecting the first display image is received (YES in Step S2), the third control unit 350 transmits, to the projector 100, the first display image selected by the received operation (Step S3).

Subsequently, the third control unit 350 transmits a request for acquiring the sensor data to the HMD 200 (Step S4), and determines whether the sensor data is received from the HMD 200 (Step S5). When the sensor data is not received from the HMD 200 (NO in Step S5), the third control unit 350 stands by until the sensor data is received.

When the sensor data is received from the HMD 200 (YES in Step S5), the third control unit 350 acquires the captured image from the external camera 211 that is contained in the sensor data. The third control unit 350 analyzes the acquired captured image, and determines whether the first display image is detected from the predetermined range of the captured image (Step S6).

When the first display image is not detected from the predetermined range of the captured image (NO in Step S6), the third control unit 350 determines whether an operation for terminating display is received (Step S8). The operation for terminating display is not received (NO in Step S8), the third control unit 350 returns to the processing in Step S3. The operation for terminating display is received (YES in Step S8), the third control unit 350 terminates the processing flow.

When the first display image is detected from the predetermined range of the captured image (YES in Step S6), the third control unit 350 determines that the second display region of the HMD 200 overlaps with the projection surface 10. In this case, the third control unit 350 detects the orientation of the head of the user U, based on the sensor data acquired in Step S5 (Step S9), and detects the distance between the HMD 200 and the projection surface 10 (Step S10). Further, the third control unit 350 detects the angle θ formed between the HMD 200 and the projection surface 10, based on the sensor data acquired in Step S6 (Step S11).

Subsequently, the third control unit 350 determines the first range being the range of the projection surface 10 with which the first display region 50 overlaps, based on the orientation of the head of the user U, the distance between the HMD 200 and the projection surface 10, and the angle of the projection surface 10 with respect to the HMD 200 that are detected (Step S12).

Subsequently, the third control unit 350 extracts the first display image thus determined corresponding to the first range of the projection surface 10, based on the calibration data 173 (Step S13). Subsequently, the third control unit 350 transmits the first display image to the projector 100 (Step S14), and transmits, to the HMD 200, the second display image being the image extracted from the first display image (Step S15).

Subsequently, the third control unit 350 acquires information relating to an angular speed contained in the sensor data received from the HMD 200 (Step S16). The third control unit 350 determines the head of the user U turns, based on the acquired information relating to the angular speed (Step S17).

When turning of the head of the user U is not detected (NO in Step S17), the third control unit 350 continues transmission of the first display image to the projector 100 (Step S19), and continues transmission of the second display image to the HMD 200 (Step S20). Then, the third control unit 350 determines whether the operation for terminating display is received (Step S21). The operation for terminating display is not received (NO in Step S21), the third control unit 350 returns to the processing in Step S16. Further, when the operation for terminating display is received (YES in Step S21), the third control unit 350 terminates the processing flow.

Further, when turning of the head of the user U is detected (YES in Step S17), the third control unit 350 acquires the captured image from the external camera 211, and analyzes the captured image thus acquired. The third control unit 350 determines whether the first display image is detected from the predetermined range of the captured image (Step S18).

When the first display image is not detected from the predetermined range of the captured image (NO in Step S18), the third control unit 350 determines that the second display region 70 of the HMD 200 does not overlap with the projection surface 10. Then, the processing proceeds to Step S19.

Further, when the first display image is detected from the predetermined range of the captured image (YES in Step S18), the third control unit 350 determines that the second display region 70 of the HMD 200 overlaps with the projection surface 10. In this case, the third control unit 350 calculates the moving direction and the moving amount for moving the object, based on the information relating to the angular speed that is acquired in Step S16 and the information relating to the distance to the projection surface 10 that is detected in Step S10 (Step S22).

Subsequently, the third control unit 350 moves the display position of the object, based on the moving direction and the moving amount of the first range that are calculated in Step S22, and generates the first display image (Step S23). The third control unit 350 transmits the first display image thus generated to the projector 100 (Step S24). Further, the third control unit 350 transmits the second display image to the HMD 200 (Step S25). The display position of the object included in the second display image is the same position as the display position of the object included in the second display image that is transmitted to the HMD 200 in Step S15. The third control unit 350 transmits the second display image to the HMD 200, and then returns to the processing in Step S16.

6. Summary of Present Disclosure

The supplementary notes for the summary of the present disclosure are given below.

Supplementary Note 1

A display system, including:
a display device configured to display a first display image on a first display region;
a head-mounted display device configured to be mounted on a head of a user and including a display unit configured to display a second display image on a second display region with an outside scene visually recognizable; and
a control device including
a detection unit configured to detect a first range and a second range when the user visually recognizes the first display image through the display unit, the first range being a range of the first display region with which the second display region overlaps, the second range being a range of the first display image corresponding to the first range, and
a generation unit configured to generate the first display image including an object and the second display image including the object, wherein
the display device displays the first display image including the object,
the head-mounted display device displays the second display image including the object, and
the control device generates the first display image by arranging, at a position within the second range corresponding to a position of the second display region for displaying the object, the object having a display size corresponding to a distance between the first display region and the head-mounted display device.

With this configuration, when the user visually recognizes the first display region through the display unit, the object displayed by the display device and the object displayed by the head-mounted display device are visually recognized in an overlapping manner. Thus, even when image quality of the first display image displayed by the display device is low, image quality of the object visually recognized by the user can be improved when the user visually recognizes the object included in the second display image displayed by the head-mounted display device.

Supplementary Note 2

The display system according to Supplementary Note 1, wherein
  the control device acquires
    information indicating an angular speed of turning of the head of the user about a body axis, and
    information indicating a distance between a display surface on which the display device displays the first display image and the head-mounted display device, and
  the generation unit generates the first display image obtained by changing a display position of the object, based on the information indicating the angular speed and the information indicating the distance.

With this configuration, in a case in which the user visually recognizes the first display region through the display unit, even when the user turns the head, the user can visually recognize the object displayed by the display device and the object displayed by the head-mounted display device in an overlapping manner. Thus, even when image quality of the first display image displayed by the display device is low, image quality of the object visually recognized by the user can be improved when the user visually recognizes the object included in the second display image displayed by the head-mounted display device.

Supplementary Note 3

The display system according to Supplementary Note 2, wherein
  a display size of the object included in the first display image is changed so that a display size of the object displayed in the first display image when a distance between the display surface and the head-mounted display device is a first distance is larger than a display size of the object displayed in the first display image when a distance between the display surface and the head-mounted display device is a second distance larger than the first distance.

With this configuration, when the user visually recognizes the first display region through the display unit, the display sizes of the object displayed by the display device and the object displayed by the head-mounted display device that are visually recognized by the user can match with each other. Thus, the user can visually recognize the object without feeling a sense of incongruity.

Supplementary Note 4

The display system according to any one of Supplementary Notes 1 to 3, wherein
  the detection unit detects the first range, based on a distance between the first display region and the display unit and an angle of the first display region with respect to the display unit.

With this configuration, detection accuracy of the first range can be improved.

Supplementary Note 5

The display system according to Supplementary Note 2 or 3, wherein
  the detection unit detects the first display region of the display surface, based on a distance between the display surface and the display device and an angle of the display surface with respect to the display device.

With this configuration, the first display region in which the display device displays the first display image can be detected at high accuracy.

Supplementary Note 6

A control device for controlling an image displayed on a display device configured to display a first display image on a first display region and a head-mounted display device configured to be mounted on a head of a user and including a display unit configured to display a second display image on a second display region with an outside scene visually recognizable, the control device including:
  a detection unit configured to detect a first range and a second range when the user visually recognizes the first display image through the display unit, the first range being a range of the first display region with which the second display region overlaps, the second range being a range of the first display image corresponding to the first range;
  a generation unit configured to generate the first display image including an object and the second display image including the object; and
  a transmission unit configured to transmit the first display image including the object to the display device and transmit the second display image including the object to the head-mounted display device, wherein
  the generation unit generates the first display image by arranging, at a position within the second range corresponding to a position of the second display region for displaying the object, the object having a display size corresponding to a distance between the first display region and the head-mounted display device.

With this configuration, when the user visually recognizes the first display region through the display unit, the object displayed by the display device and the object displayed by the head-mounted display device are visually recognized in an overlapping manner. Thus, even when image quality of the first display image is low, image quality of the object visually recognized by the user can be improved when the user visually recognizes the object included in the second display image displayed by the head-mounted display device.

Supplementary Note 7

A display method of a display system, the display system including a display device configured to display a first display image on a first display region and a head-mounted display device configured to be mounted on a head of a user and including a display unit configured to display a second display image on a second display region with an outside scene visually recognizable, the display method including:
  detecting a first range and a second range when the user visually recognizes the first display image through the display unit, the first range being a range of the first display region with which the second display region overlaps, the second range being a range of the first display image corresponding to the first range;
  generating the first display image including an object and the second display image including the object; and
  transmitting the first display image including the object to the display device and transmitting the second display image including the object to the head-mounted display device, wherein
  in the generation of the first display image, the first display image is generated by arranging, at a position within the second range corresponding to a position of the second display region for displaying the object, the object having a display size corresponding to a distance between the first display region and the head-mounted display device.

With this configuration, when the user visually recognizes the first display region through the display unit, the object displayed by the display device and the object displayed by the head-mounted display device are visually recognized in an overlapping manner. Thus, even when image quality of the first display image is low, image quality of the object visually recognized by the user can be improved when the user visually recognizes the object included in the second display image displayed by the head-mounted display device.

The present disclosure is not limited to the configurations in each of the exemplary embodiments described above, and can be implemented in various aspects without departing from the gist of the disclosure.

For example, each of the functional units of the projector 100 illustrated in FIG. 2, the HMD 200 illustrated in FIG. 3, and the control device 300 illustrated in FIG. 4 indicates a functional configuration implemented by hardware and software in collaboration. Specific implementation modes thereof are not particularly limited. Therefore, hardware that individually corresponds to each of the functional units is not necessarily implemented, and a configuration is possible as a matter of course in which a single processor executes a program to enable functions of a plurality of functional units. Furthermore, in the above-described exemplary embodiments, some of the functions realized by software may be realized by hardware, or some of the functions realized by hardware may be realized by software.

Further, when the display method of the display system is implemented through use of a computer mounted on the control device 300, a program executed by the computer may be configured in a form of a recording medium. Further, the program to be executed by the computer may be configured as a form of a transmission medium that transmits a program. As the recording medium, a magnetic or optical recording medium, or a semiconductor memory device may be used. Specifically, a portable or stationary type recording medium, such as a flexible disk, an HDD, a Compact Disc Read-Only Memory (CD-ROM), a Digital Versatile Disc (DVD), a Blu-ray disc, a magneto-optical disc, a flash memory, a card type recording medium, or the like may be exemplified. Further, the recording medium described above may be a non-volatile storage device such as a RAM, a ROM, and an HDD, all representing internal storages included in a server device. Blu-ray is a registered trademark.

Further, a processing unit in the flowcharts illustrated in FIG. 10 and FIG. 11 is obtained through division in accordance with the main processing contents for easy understanding of the processing of the third control unit 350. The present disclosure is not limited by a division method or a name of the processing unit illustrated in the flowcharts of FIG. 10 and FIG. 11. Further the processing of the third control unit 350 may be divided into more processing units in accordance with a processing content, and may be divided such that one processing unit includes more processing. Furthermore, the processing order of the above-described flowchart is also not limited to the illustrated example.

Further, the exemplary embodiment described above illustrates the configuration in which the projector 100 is used as the display device, but the display device is not limited to the projector 100. For example, examples of the display device include a liquid crystal display device that displays an image on a liquid crystal display panel and a display device that displays an image on an organic EL panel, and the display device may be a display device of a self light-emitting type such as a monitor and a liquid crystal television.

Further, as an example, the exemplary embodiment described above illustrates the display system 1 in which the projector 100, the HMD 200, and the control device 300 are separate bodies, but the display system 1 is not limited thereto. For example, there may be adopted a configuration in which the projector 100 includes the control device 300 built therein or a configuration in which the HMD 200 includes the control device 300 built therein. In other words, there may be adopted a configuration in which the first control unit 160 of the projector 100 or the HMD control device 230 of the HMD 200 operate as the control device 300.

Further, the configuration of the optical system of the HMD display device 210 is freely selected, and an optical member that is positioned in front of the eyes of the user U and overlap with a part or an entirety of the visual field of the user U may be used. Alternatively, there may be adopted a scanning-type optical system in which image light is generated by performing scanning with laser light or the like. Alternatively, the optical system is not limited to an optical system that guides image light inside the optical member, and may be an optical system that only has a function of guiding image light to the eyes of the user U while refracting or reflecting the image light.

Further, a line-of-sight direction of the user U and a position of a gazing point at which the user U gazes in a depth direction may be detected from the captured images from the internal camera 213. The third control unit 350 detects the line-of-sight direction of the left eye and the line-of-sight direction of the right eye, respectively, as the line-of-sight directions of both the eyes of the user U. The third control unit 350 detects the position of the gazing point in the depth direction, based on the point at which the line-of-sight direction of the left eye and the line-of-sight direction of the right eye intersect with each other. The point at which the line-of-sight direction of the left eye and the line-of-sight direction of the right eye intersect with each other corresponds to the position of the gazing point in the depth direction. The third control unit 350 calculates a position of the image in the depth direction that is visually recognized by the user U, based on the detected position of the gazing point in the depth direction, executes an arithmetic operation for parallax of both the eye views so that a visual image is recognized at the calculated position in the depth direction, and transmits the right and left images with parallax to the HMD 200.

What is claimed is:
1. A display system, comprising:
a display device configured to display a first display image on a first display region;
a head-mounted display device configured to be mounted on a head of a user and including a display unit configured to display a second display image on a second display region with an outside scene visually recognizable; and
a control device including
a detection unit configured to detect a first range and a second range when the user visually recognizes the first display image through the display unit, the first range being a range of the first display region with which the second display region overlaps, the second range being a range of the first display image corresponding to the first range, and a generation unit configured to generate the first display image including an object and the second display image including the object, wherein the display device displays the first display image including the object, the head-mounted display device displays the second display image including the object, and the control device generates the first display image by arranging, at a position within the second range corresponding to a position of the second display region for displaying the object, the object having a display size corresponding to a distance between the first display region and the head-mounted display device, wherein the display size of the object displayed on the first display region matches with the display size of the object displayed in the second display region by the head-mounted display device.

2. The display system according to claim 1, wherein the control device acquires information indicating an angular speed of turning of the head of the user about a body axis, and information indicating a distance between a display surface on which the display device displays the first display image and the head-mounted display device, and the generation unit generates the first display image obtained by changing a display position of the object, based on the information indicating the angular speed and the information indicating the distance.

3. The display system according to claim 2, wherein a display size of the object included in the first display image is changed so that a display size of the object displayed in the first display image when a distance between the display surface and the head-mounted display device is a first distance is larger than a display size of the object displayed in the first display image when a distance between the display surface and the head-mounted display device is a second distance larger than the first distance.

4. The display system according to claim 1, wherein the detection unit detects the first range, based on a distance between the first display region and the display unit and an angle of the first display region with respect to the display unit.

5. The display system according to claim 2, wherein the detection unit detects the first display region of the display surface, based on a distance between the display surface and the display device and an angle of the display surface with respect to the display device.

6. A control device for controlling an image displayed on a display device configured to display a first display image on a first display region and a head-mounted display device configured to be mounted on a head of a user and including a display unit configured to display a second display image on a second display region with an outside scene visually recognizable, the control device comprising:

a detection unit configured to detect a first range and a second range when the user visually recognizes the first display image through the display unit, the first range being a range of the first display region with which the second display region overlaps, the second range being a range of the first display image corresponding to the first range;

a generation unit configured to generate the first display image including an object and the second display image including the object; and a transmission unit configured to transmit the first display image including the object to the display device and transmit the second display image including the object to the head-mounted display device, wherein the generation unit generates the first display image by arranging, at a position within the second range corresponding to a position of the second display region for displaying the object, the object having a display size corresponding to a distance between the first display region and the head-mounted display device, wherein the display size of the object displayed on the first display region matches with the display size of the object displayed in the second display region by the head-mounted display device.

7. A display method of a display system, the display system including a display device configured to display a first display image on a first display region and a head-mounted display device configured to be mounted on a head of a user and including a display unit configured to display a second display image on a second display region with an outside scene visually recognizable, the display method comprising:

detecting a first range and a second range when the user visually recognizes the first display image through the display unit, the first range being a range of the first display region with which the second display region overlaps, the second range being a range of the first display image corresponding to the first range;

generating the first display image including an object and the second display image including the object; and transmitting the first display image including the object to the display device and transmitting the second display image including the object to the head-mounted display device, wherein in the generation of the first display image, the first display image is generated by arranging, at a position within the second range corresponding to a position of the second display region for displaying the object, the object having a display size corresponding to a distance between the first display region and the head-mounted display device, wherein the display size of the object displayed on the first display region matches with the display size of the object displayed in the second display region by the head-mounted display device.

* * * * *